United States Patent [19]

Bukhtiyarov et al.

[11] 4,215,404

[45] Jul. 29, 1980

[54] AUTOMATIC DEVICE FOR DIAGNOSTIC CHECKUP OF VEHICLES

[76] Inventors: Ivan D. Bukhtiyarov, dom 3, kv. 157; Veniamin G. Potanin, dom 3, kv. 12; Viktor V. Alt, dom 3, kv. 13; Evgeny A. Rakhmanin, dom 3, kv. 149; Vladimir M. Lyzlov, dom 19, kv. 5; Viktor B. An, dom 3, kv. 5; Valery P. Anikin, dom 11, kv. 4; Vladimir G. Koshevoi, dom 18, kv. 12, all of r/p Krasnoobsk Novosibirskoi oblasti; Nikolai G. Timonin, ulitsa Filatova, 10, kv. 114, Novosibirsk; Gennady P. Zhdanov, ulitsa Chrnyakhovskogo, 41, kv. 48, s. Baryshevo Novosibirskoi oblasti; Alfred I. Gibert, dom 7, kv. 167; Vladimir M. Kolesnikov, dom 7, kv. 188, both of r/p Krasnoobsk Novosibirskoi oblasti, all of U.S.S.R.

[21] Appl. No.: 941,593

[22] Filed: Sep. 12, 1978

[51] Int. Cl.² .......................................... G01M 15/00
[52] U.S. Cl. .................................. 364/431; 73/117.3; 324/378; 340/52 R; 364/424
[58] Field of Search ............... 364/424, 425, 431, 442; 73/116, 119 R, 119 A, 117.2, 117.3; 324/15, 16 R, 16 T; 340/52 R

[56] References Cited

U.S. PATENT DOCUMENTS

| | | | |
|---|---|---|---|
| 3,186,218 | 6/1965 | Hollis | 73/117.2 |
| 3,750,465 | 8/1973 | Howell et al. | 364/431 |
| 4,125,894 | 11/1978 | Cashel et al. | 364/442 |
| 4,128,005 | 12/1978 | Arnston et al. | 73/117.3 |

*Primary Examiner*—Errol A. Krass
*Attorney, Agent, or Firm*—Fleit & Jacobson

[57] ABSTRACT

An automatic device comprises a complex plane analyzer of a vibration signal of a measured engine unit, electrically coupled via a switch to a computer. The device also comprises a synchronization unit whose inputs are connected to sensors of the angular position of the vehicle engine shaft and transmission shaft, an ignition sensor and a sensor of fuel injection to the cylinders of the vehicle engine. A control input of the unit is coupled to the output of a control unit. There is also an operational parameter measuring unit connected by its inputs to outputs of the synchronization unit and to the output of the control unit. An engine shaft rotational frequency adjustment unit is connected by its input to the control unit and to the synchronization unit and by its output to the actuator controlling fuel supply to the engine cylinders.

3 Claims, 11 Drawing Figures

FIG. 1b

AUTOMATIC DEVICE FOR DIAGNOSTIC CHECKUP OF VEHICLES

FIELD OF THE INVENTION

This invention relates to engineering inspection of vehicles and machinery and, in particular, to an automatic device for diagnostic checkup of vehicles.

The device is predominantly used for inspecting technical condition of vehicles, compressors, agricultural machinery, ship engines, etc. The device can also be employed for testing prototypes for scientific research purposes.

PRIOR ART

In order to increase reliability and efficiency of employment of vehicles and machinery prompt and precise inspection of a vehicle as a whole and its separate parts is required both at manufacturing plants and in the process of operation.

The accuracy of automatic devices for technical diagnostic checkup of vehicles known in the art is low and, in consequence, the diagnosis of technical condition of vehicles is inaccurate too.

Known in the art is an automatic device for technical diagnostic checkup of vehicles, comprising at least one vehicle engine vibration sensor and at least one transmission vibration sensor electrically connected to the inputs of a switch whose control input is connected to the output of a control unit, whereas the output is connected to the input of a variable bandwidth filter (cf., for example, the USSR Inventor's Certificate No. 216,311).

The above described device also comprises an integrator whose input is connected to the output of the filter, whereas the output is connected to the input of an analog-to-digital conveter. The output of the analog-to-digital converter is connected to the input of a code converter which is connected to a punch.

The technical condition of a vehicle in the above described device is estimated only by the vibration parameters and cannot be accurate since in this case no account is taken of operational parameters—the engine shaft rotational frequency, the temperature of oil and liquid coolant, the oil pressure in the system. Besides, the vibration parameters alone cannot provide a basis for estimation of basic operational characteristics of a vehicle, such as power, efficiency, mechanical losses. Vital in the engine are the fuel supply system and the ignition system, which are also left unchecked in this device. Here the condition of the fuel supply system and the ignition system has a substantial effect upon the processes in the combustion chamber of the vehicle and its vibration. Besides, the absence of synchronization with the rotational angle of the engine shafts does not permit location of faults resulting in different vibration parameters.

Moreover, such a device does not provide for any control of the operation of the vehicle under check. The operation of the device is confined to recording of measurements on a punched tape and further analyses is supposed to be done with the help of a computer. No estimation of the technical condition of a vehicle is consequently possible in the process of the checkup and the vehicle being inspected cannot be actively controlled.

BRIEF DESCRIPTION OF THE INVENTION

It is an object of this invention to provide an automatic device for diagnostic checkup of vehicles, characterized by improved accuracy and reliability of the diagnostic inspection of technical parameters of vehicles accompanied by the indication of fault locations.

Another object of this invention is to enlarge the functions of the automatic device, that is to ensure measurement of power and operational characteristics of vehicles and determination of parameters of processes going on in the combustion chamber.

Still another object of the invention is to process and compute all vehicle parameters in the real-time scale.

These objects are achieved by that in an automatic device for diagnostic checkup of vehicles, comprising at least one vehicle engine vibration sensor and at least one transmission vibration sensor, which are electrically connected to inputs of a first switch whose control input is connected to the output of a control unit, whereas its output is connected to the input of a variable bandwidth filter, according to the invention, there is provided a complex plane analyzer of vibration signals of an engine unit being diagnosed, whose input is connected to the output of the first switch, a second switch whose inputs are connected to the amplitude output of the complex plane analyzer, the phase output of the complex plane analyzer and the output of the variable bandwidth filter, a signal averaging unit whose information and synchronization inputs are connected to respective outputs of the second switch and from whose output the signal is fed to the input of a computer, whereas the output of the control unit is connected to the control input of the variable bandwidth filter, to the control input of the second switch and to the control input of the signal averaging unit, a synchronization unit whose control input is connected to the output of the control unit to whose input a control signal is fed from the computer, a vehicle engine shaft angular position sensor, a transmission shaft angular position sensor, at least one sensor of fuel injection to vehicle engine cylinders, whose outputs are connected to respective inputs of the synchronization unit whose one output is connected to the second input of the vibration signal complex plane analyzer, to the input of the second switch and to the input of the computer, and there are also provided an engine operational parameters measuring unit connected by its inputs to the outputs of the synchronization unit and to the output of the control unit, an engine oil temperature sensor, an engine oil pressure sensor, an engine liquid coolant temperature sensor, an engine fuel consumption sensor, at least one engine combustion chamber gas pressure sensor, a spark plug voltage shape sensor, which are connected to respective inputs of the engine operational parameters measuring unit from whose output a signal is fed to the input of the computer, an engine shaft rotational frequency adjustment unit, whose control input is connected to the output of the control unit, whereas its information input is connected to the output of the synchronization unit, an actuator for controlling fuel supply to engine cylinders, which is connected to the output of the engine shaft rotational frequency adjustment unit.

It is advisable that the engine operational parameters measurement unit comprises a switch whose output serves as the output of the operational parameters measurement unit, an angular measurement unit whose inputs receive signals from respective outputs of the synchronization unit and whose output is connected to the input of the switch, a unit for measuring the angular speed and rotary acceleration of the engine shaft, whose inputs receive signals from the respective output of the synchronization unit and whose outputs are connected to the input of the switch, a spark failure percentage calculation unit whose inputs receive signals from respective outputs of the synchronization unit and whose output is connected to the input of the switch, an engine electrical parameter measuring unit whose input receives signals from the output of the spark plug voltage shape sensor and whose output is connected to the input of the switch, a combustion chamber pressure measuring unit whose input receives signals from the output of the combustion chamber gas pressure sensor and whose output is connected to the input of the switch, a fuel consumption measuring unit whose input receives signals from the fuel consumption sensor and whose output is connected to the input of the switch, all other inputs of the switch receiving signals from the oil temperature sensor, the oil pressure sensor and from the liquid coolant temperature sensor.

It is advantageous that in an automatic device, wherein the engine shaft rotational frequency adjustment unit comprises a pulse length generator whose input serves as the input of the engine shaft rotational frequency adjustment unit and whose output is connected to an input of an AND gate whose another input is connected to an output of a reference frequency generator whose input serves as another input of the engine shaft rotational frequency adjustment unit, whereas the output on the AND gate is connected to the counting input of a binary counter whose output is connected to the input of a circuit for determination of the sign of deviation of the parameter being adjusted, whose outputs are connected to inputs of gates whose second inputs are connected to an output of a regulation signal generator and whose outputs serve as the output of the engine shaft rotational frequency adjustment unit, the engine shaft rotational frequency adjustment unit comprises a circuit for determination of the adjusted parameter deviation magnitude, whose input is connected to a second output of the binary counter, whereas its output is connected to an input of the regulation signal generator.

The proposed automatic device for diagnostic checkup of vehicles possesses some substantial advantages as compared to the known devices.

Introduction of a complex plane analyzer permits detection and location of faults in rolling bearings expressed in angular coordinates of the external or internal ring of the bearing. Introduction of an averaging unit permits detection of faults showing themselves in synchronism with the period of rotation of the shaft of the unit being checked, for example, valve and gear noise, etc. Introduction of a computer permits correction of the technical condition evaluation based on the vibration parameters, as well as control function of the vehicle being checked. The angular speed and acceleration measuring unit permits control of the vehicle or machine operation, as well as generation of pertinent data for computing the engine power while accelerating and mechanical losses during deceleration.

The fuel consumption sensor permits generation of data for calculating the efficiency of the vehicle engine, whereas combustion chamber gas pressure sensors permit evaluation of compression in cylinders, distribution of power by cylinders of the internal combustion engine. The spark voltage shape sensor produces an analog signal required for evaluation of the ignition system quality. The ignition advance angle measuring unit and the spark failure percentage calculation unit permit control of the ignition system and correction of the evaluation of the technical condition of the engine. The rotational frequency adjustment unit ensures automatic setting and maintenance of the engine operation, as well as control over a transient engine operational mode in order to measure the power of the engine and mechanical losses.

BRIEF DESCRIPTION OF DRAWINGS

The invention will now be described in greater detail with reference to a specific embodiment thereof, taken in conjunction with the accompanying drawings, wherein:

FIGS. 3 a,b,c,d,e,f,g illustrate diagrams of signals at outputs of various units of the proposed automatic device, according to the invention.

DETAILED DESCRIPTION OF THE INVENTION

Figure 1A:
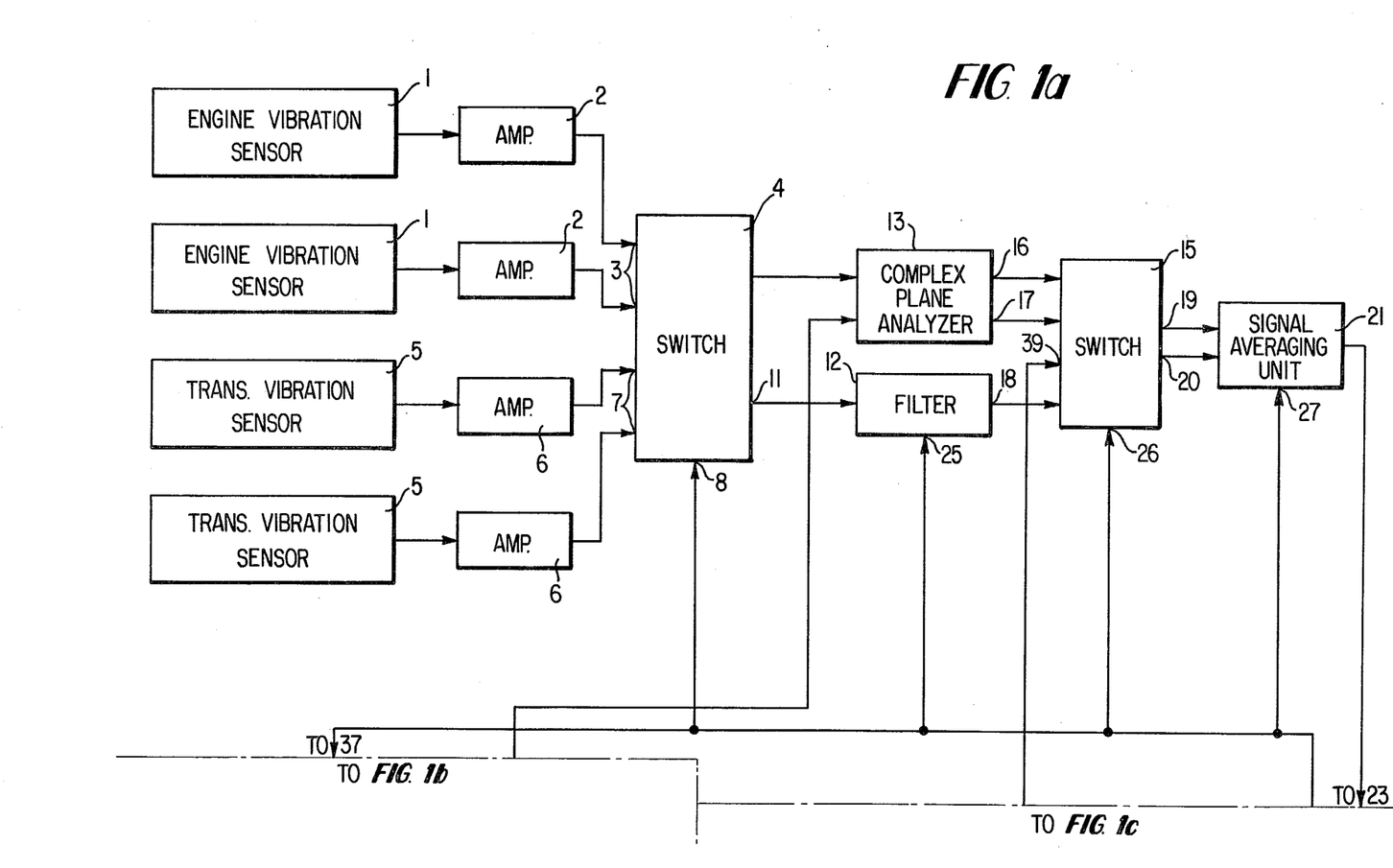
FIGS. 1a-c illustrate a block diagram of an automatic device for diagnostic checkup of vehicles, according to the invention.
Figure 1B:
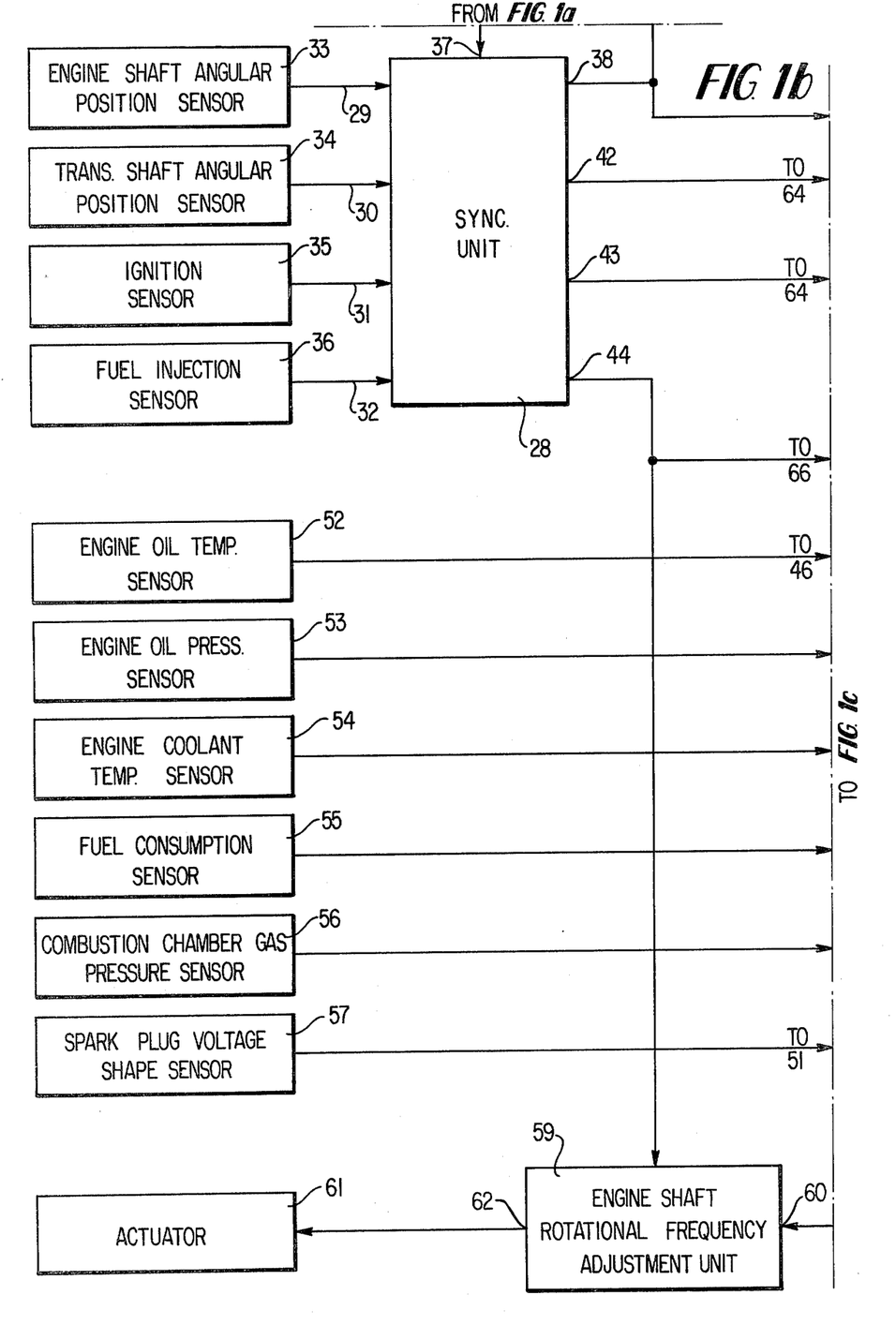
Figure 1C:
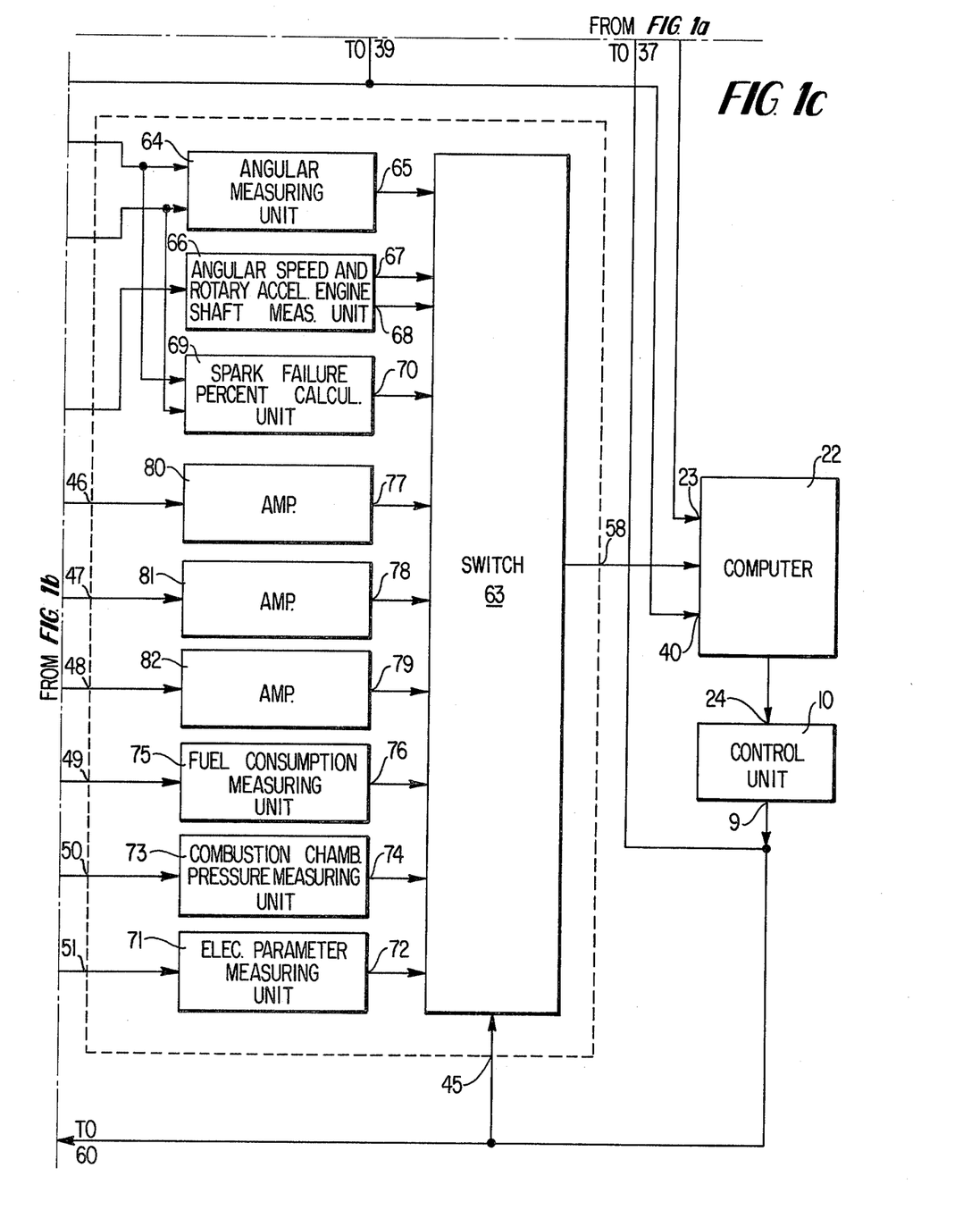

An automatic device for diagnostic checkup of vehicles comprises two vehicle engine vibration sensors 1 (FIG. 1) connected through amplifiers 2 to inputs 3 of a switch 4. The sensors 1 of engine vibration are piezoelectric pickups positioned on the vehicle engine (not shown). The automatic device also comprises two vehicle transmission vibration sensors 5 which are similar to the sensors 1 and connected via amplifiers 6 to inputs 7 of the switch 4. A control input 8 of the switch 4 is connected to an output 9 of a control unit 10, whereas an output 11 of the switch 4 is connected to the input of a filter 12. In the described embodiment the filter 12 is analogous to that described in the USSR Inventor's Certificate N 347,709,1972.

The automatic device comprises also a complex plane analyzer 13 connected by its input 14 to the output of the switch 4. The complex plane analyzer 13 is analogous to that described in the book entitled "Reference Book on Theory of Electronics" by Krivitsky, "Energya" Publishers, Moscow, 1977. The device also comprises a second switch 15 whose inputs are connected to an amplitude output 16 and a phase output 17 of the complex plane analyzer 13 and to an output 18 of the filter 12. In the described embodiment the switches 4 and 15 are analogous to those described in the book entitled "Integrated Circuits Reference Book", 143 series, 1974. Outputs 19 and 20 of the second switch 15 are connected respectively to information and synchronization inputs of a signal averaging unit 21 which is a signal analyzer described in a leaflet issued by the Krasnodar Electrical Measuring Instruments Plant, p. 37, 1976.

The automatic device of this embodiment also comprises a computer 22 whose input 23 is connected to the output of the signal averaging unit 21 and whose output is connected to an input 24 of the control unit 10 whose output 9 is connected to a control input 25 of the filter 12, to a control input 26 of the second switch 15, to a control input 27 of the signal averaging unit 21. There is a synchronization unit 28 whose inputs 29, 30, 31 and 32 are connected respectively to an engine shaft angular position sensor 33, a transmission shaft angular position sensor 34, an ignition sensor 35 and a sensor 36 of fuel injection to engine cylinders.

The synchronization unit 28 comprises a pulse shaper (not shown in the drawing) which receives the pulses from the sensor 34 and is coupled via a switch to a scaler.

The sensors 33 and 34 are photoelectric pickups, whereas sensors 35 and 36 are induction transducers.

A control input 37 of the synchronization unit 28 is connected to the output 9 of the control unit 10, whereas an output 38 is connected to a second input of the complex plane analyzer 13, to an input 39 of the second switch 15 and to an input 40 of the computer 22.

There is also provided an engine operational parameter measuring unit 41 whose inputs are connected to respective outputs 42, 43, 44 of the synchronization unit 28 and whose input 45 is connected to the output 9 of the control unit 10. Inputs 46, 47, 48, 49, 50 and 51 are connected respectively to an engine oil temperature sensor 52, an engine oil pressure sensor 53, an engine liquid coolant temperature sensor 54, a fuel consumption sensor 55, a combustion chamber gas pressure sensor 56, a spark plug voltage shape sensor 57. An output 58 of the unit 41 is connected to the input of the computer 22.

The device also comprises an engine shaft rotational frequency adjustment unit 59 whose control input 60 is connected to the output 9 of the control unit 10, whereas the information input is connected to the output 44 of the synchronization unit 28. There is also provided an actuator 61 for controlling fuel supply, which is connected to an output 62 of the unit 59, the actuator 61 being connected to a unit (not shown in FIG. 1) supplying the fuel to the engine.

The sensors 52 and 54 are resistance thermometers, the sensors 53 and 56 are piezoelectric pickups, the sensor 57 is a capacitive voltage divider. The fuel consumption sensor 55 is described below.

The operational parameter measuring unit 41 comprises a switch 63 whose output serves as the output 58 of the operational parameter measuring unit 41 and an angular measurement unit 64. One input of the unit 64 is intended for receiving the ignition point signal and is connected to the output 42 of the synchronization unit 28, whereas another input intended for receiving the engine operation cycle initial signal is connected to the output 43 of the synchronization unit 28, an output 65 of the angular measurement unit 64 being connected to the input of the switch 63.

The operational parameter measuring unit 41 comprises a unit 66 for measuring the angular speed and rotary acceleration of the engine shaft, whose input which is intended for receiving engine shaft angular position signals is connected to the output 44 of the synchronization unit 28 and whose outputs 67 and 68 are connected to inputs of the switch 63.

The operational parameter measuring unit 41 also comprises a spark failure percentage calculating unit 69 whose inputs are connected to the outputs 42 and 43 and whose output 70 is connected to the input of the switch 63. The unit 41 is analogous to that described in the USSR Inventor's Certificate Application No. 1,633,137 dated Mar. 10, 1971, which issued as Certificate No. 370,361 on Feb. 15, 1973. There is also provided an electrical parameter measuring unit 71 whose input serves as the input 51 of the operational parameter measuring unit 41, whereas an output 72 is connected to an input of the switch 63. There is also provided a unit 73 for measuring pressure in the combustion chamber, whose input serves as the input 50 of the operational parameter measuring unit 41, whereas an output 74 is connected to an input of the switch 63.

The operational parameter measuring unit 41 also comprises a fuel consumption measuring unit 75 whose input serves as the input 49 of the operational parameter measuring unit 41, whereas an output 76 is connected to an input of the switch 63.

Inputs of the switch 63 are connected to outputs 77, 78 and 79 of amplifiers 80, 81 and 82 respectively, whose inputs serve as the inputs 46, 47 and 48 of the unit 41 respectively.

The engine rotational frequency adjustment unit 59 comprises a pulse length generator 83 (FIG. 2) whose input serves as an input of the engine rotational frequency adjustment unit 59 and is connected to the synchronization unit 28 (not shown in FIG. 2) and whose output is connected to an input 84 of an AND gate 85. Another input 86 of the AND gate 85 is connected to an output of a reference frequency generator 87 whose input serves as the input of the engine rotational frequency adjustment unit 59, which is connected to the control unit 10 (not shown in FIG. 2). The output of the AND gate 85 is connected to a counting input 88 of a binary counter 89 whose one input is connected to an input 90 of a circuit 91 for determination of sign of deviation of the parameter being adjusted. In this embodiment of the automatic device the circuit 91 for determination of sign of deviation of the parameter being adjusted is made in a conventional manner (cf., for example, Great Britain Patent No. 1,309,711).

Figure 2:
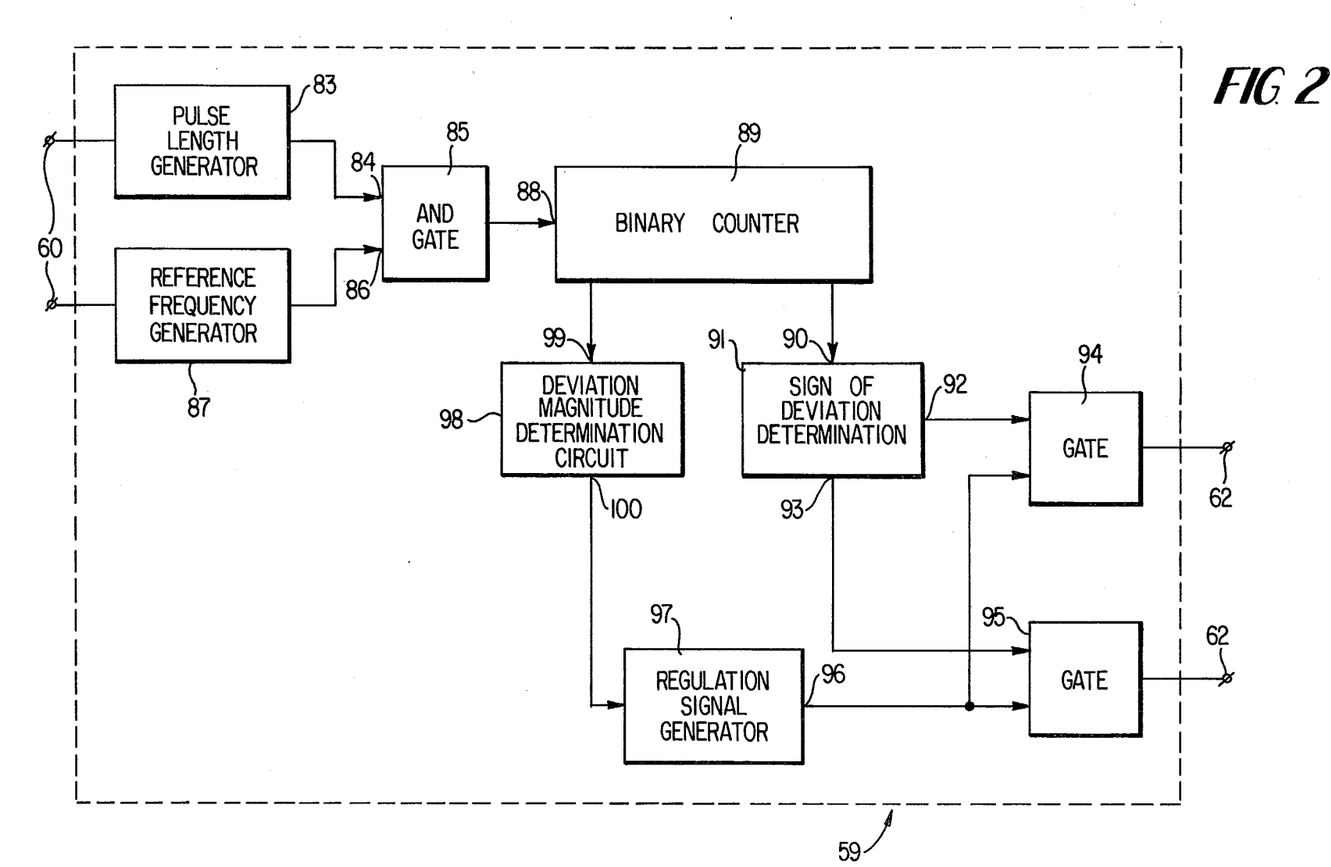
FIG. 2 illustrates a block diagram of an engine rotational frequency adjustment unit, according to the invention.

Outputs 92 and 93 of the circuit 91 are connected to first inputs of gates 94 and 95, respectively, whose second inputs are connected to an output 96 of a regulation signal generator 97. Outputs of gates 94 and 95 are the output 62 of the unit 59.

The engine rotational frequency adjustment unit 59 also comprises a circuit 98 for determination of magnitude of deviation of the parameter being adjusted, whose input 99 is connected to a second output of the binary counter 89, whereas an output 100 is connected to an input of the regulation signal generator 97. In this embodiment the circuitry of the circuit 98 for determination of the magnitude of deviation is similar to that of the circuit 91 for determination of sign.

The fuel consumption sensor 55 of the unit 75 is a conventional device described, for example, in the book entitled "Flow Meters and Counters" by P. P. Kremlevsky, "Mashinostroenie" Publizhers, Leningrad, 1975, p. 713.

For better understanding the operation of the proposed device is illustrated in FIG. 3 by diagrams of output signals of various units, wherein the engine shaft turning angle is plotted along the X axis, whereas the logical voltage levels are plotted along Y axis: FIGS. 3a and 3b illustrate output signals of the angular position sensors 33 and 34; FIG. 3c illustrates an output signal of the ignition point sensor 35; FIG. 3d illustrates a signal at the output 42 of the unit 28; FIG. 3e illustrates a signal at the output 43 of the unit 28; FIG. 3f illustrates a combustion chamber pressure signal; FIG. 3g illustrates a spark voltage signal.

Let us describe a concrete application of the proposed automatic device for diagnostic checkup of vehicles.

The proposed automatic device operates as follows.

The parallel binary instruction code is fed from the computer 22 (FIG. 1) to the input 24 of the control unit 10 where it is decoded and the parallel binary code is supplied from the output 9 to the input 60 of the engine shaft rotational frequency adjustment unit 59. This binary code corresponds to the specific rotational frequency of the engine shaft.

Pulses from the output 44 of the synchronization unit 28 are fed to another input of the engine shaft rotational frequency adjustment unit 59 with a frequency proportional to the rotational frequency of the engine shaft. A pulse-type signal is generated in the unit 59 and its frequency is proportional to the reduction rate of the error signal indicative of the mismatch between the true and intended rotational frequency of the engine shaft. The signal is then fed from the output 62 of the unit 59 to the actuator 61 which controls the throttle of the carburetor (not shown in FIG. 1).

Thus the required mode of engine operation is set, that is such frequency of rotation of the engine shaft is set which will be permanent in the course of the subsequent diagnostic checkup of the vehicle.

Adjustment of the rotational frequency of the engine is performed as follows.

A signal whose frequency is proportional to the frequency of rotation of the engine is fed to the input of the generator 83 (FIG. 2). which is a frequency divider. From the output of the generator 83 pulses whose length is proportional to the duration of the period of the input signal are fed to the input 84 of the AND gate 85, whereas signals are supplied from the output of the reference frequency generator 87, which go through to the counting input 88 of the binary counter 89 only when the signal from the output of the generator 83 is available.

In this manner the binary counter 89 periodically counts the number of pulses, which is proportional to the duration of the period of the signal fed to the input of the generator 83.

Precalculated code combinations of the binary counter 89 are supplied to the input 90 of the circuit 91 for determination of the mismatch sign and to the input 99 of the circuit 98 for determination of the magnitude of deviation of the parameter being adjusted, respectively. Code combinations fed to the circuit 91 correspond to the upper and lower boundary of the range of adjustment of the engine shaft rotational frequency; code combinations fed to the circuit 98 correspond to upper and lower boundaries of additional ranges whose absolute size is more than that of the above mentioned adjustment range.

In case the engine frequency of rotation goes beyond the limits of the adjustment range, a signal is fed either to the gate 94 or 95 depending on the sign of deviation from the outputs 92, 93 of the circuit 91. If the rotational frequency does not go beyond additional adjustment ranges, a signal from the output 96 of the regulating signal generator 97 is supplied to the input of the gates 94, 95. The frequency of such a signal ensures reduction of the error without readjustment and self-oscillations. This is achieved by the effect of a signal fed through the gates 94 or 95 to the actuator 61 which controls the fuel supply system of the engine.

When the frequency of rotation of the engine shaft goes beyond the limits of the smallest of the additional ranges of adjustment, an instruction is supplied from the output 100 of the circuit 98 to the input of the regulating signal generator 97 and it switches the generator 97 to producing a signal whose frequency is in excess of the frequency corresponding to adjustment within the limits of the smallest of the additional ranges. The sign of deviation is determined by the circuit 91 in the manner which has been already described.

In case the frequency of rotation of the engine is lower than the prescribed range, the instruction fed from the output 93 of the circuit 91 makes the gate 95 conductive to let through the signal from the generator 97 to the output 62 which feeds the actuator 61. If the frequency of rotation is higher than the prescribed range, the instruction fed from the output 92 of the circuit 91 opens the gate 94 to let through the signal from the generator 97 to the output 62 which feeds the actuator 61.

When the rotational frequency goes beyond the next additional ranges, the frequency of signal produced by the generator 97 increases stepwise. In this case the frequency of the signal grows in direct proportion with the absolute size of the additional range which the engine rotational frequency goes to.

As mismatch is reduced by adjustment, the frequency of the signal fed from the output 96 of the generator 97 reduces stepwise as the frequency of rotation of the engine shaft goes from larger additional range to a smaller one. When the frequency of rotation of the engine shaft is within the adjustment range, both gates 94 and 95 are nonconductive and the signal fed from the output 96 of the generator 97 cannot pass to the input of the actuator 61.

In case the engine shaft rotational frequency is to be put to a new operational mode, an instruction is fed to the input of the reference frequency generator 87 and it switches the generator 87 to producing a signal corresponding to a new mode of rotation. The process of converting the engine to a new frequency of rotation is similar to the above described process of adjustment when the parameter being adjusted deviates from its specified value. The use of the above described automatic device permits quicker response time in adjusting the frequency of rotation of the engine.

Two pulse signals $U_1$ and $U_2$ (FIGS. 3a and 3b) are supplied from the engine shaft angular position sensor 33 to the input 29 of the synchronization unit 28. The pulse signal $U_1$ corresponds to the shaft turning through the position which is conventionally taken as the reference point, whereas the pulse signal $U_2$ corresponds to the shaft turning through angular intervals equal to 1°.

Transmission signals similar to those of the sensor 33 are supplied from the transmission shaft angular position sensor 34 (FIG. 1) to the input 30 of the synchronization unit 28.

Figures 3A, 3B, 3C, 3D:
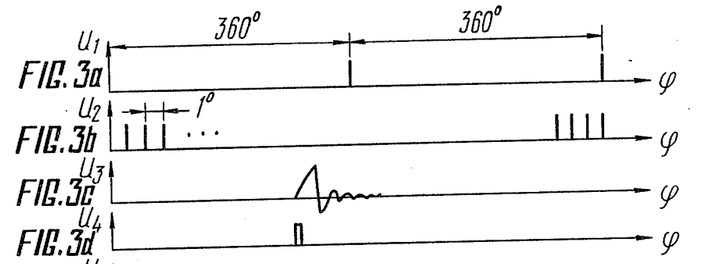
Figure 3E:
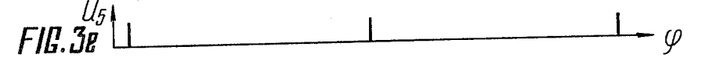
Figure 3F:
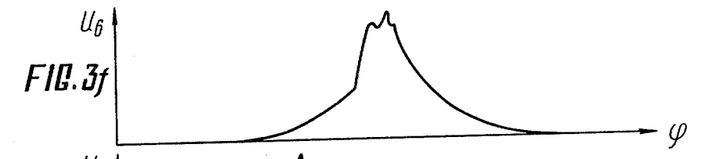
Figure 3G:
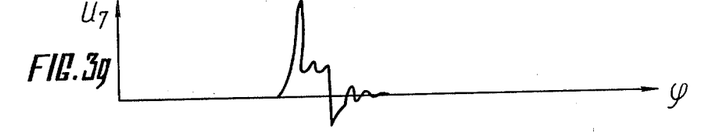

The signal $U_3$ (FIG. Uc) whose amplitude is proportional to the spark current value is supplied from the sensor 35 to the input 31 of the synchronization unit 28.

When a diesel engine is being checked out, there is used a sensor 36 (FIG. 1) of fuel injection to engine cylinders. A signal which is proportional to the movement of the injector needle is supplied from the output of the sensor 36 to the input 32 of the synchronization unit 28. A code signal is supplied from the output of the control unit 10 to the input 37 of the synchronization unit 28 and it permits signals to pass from the sensors 33 and 34 to the synchronization unit 28, as well as angles of the engine shaft to be selected so that they correspond to the top dead center position of the piston in the cylinder being monitored.

A pulse $U_4$ (FIG. 3d) which corresponds to the moment of sparking in the combustion chamber of the cylinder being monitored is supplied from the output 42 of the synchronization unit 28 to the inputs of the angular measurements unit 64 and to the input of the spark failure percentage calculating unit 69. Pulses $U_5$ (FIG. 3e) which correspond to the moment when the piston in the cylinder being monitored passes its top dead center are supplied from the output 43 (FIG. 1) of the synchronization unit 28 to the inputs of the units 64 and 69. From the output of the unit 64 (FIG. 1) the code which is proportional to the ignition advance angle is fed to the input of the switch 63. From the output of the spark failure percentage calculating unit 69 the code which corresponds to the percentage of spark failure during several operational cycles of the engine is also fed to the input of the switch 63.

Pulses $U_2$ (FIG. 3b) are supplied from the output 44 of the synchronization unit 28 to the input of the unit 66 for measuring the angular speed and rotary acceleration of the engine shaft with the frequency proportional to the frequency of rotation of the engine shaft. The instantaneous speed of rotation code is delivered to the input of the switch 63 from the output 67 (FIG. 1) of the unit 66.

The code proportional to the instantaneous acceleration is delivered to the input of the switch 63 from the output 68 of the unit 66.

The voltage proportional to the temperature of oil in the oil system of the engine is supplied from the output of the oil temperature sensor 52 to the input 46 of the engine operational parameter measuring unit 41 and is further delivered from the output 77 of the amplifier 80 to the analog input of the switch 63. The voltage proportional to the instantaneous pressure is supplied from the output of the oil pressure sensor 53 to the input 47 of the engine operational parameter measuring unit 41, where it is amplified by the amplifier 81 and is fed from the output 78 of the amplifier 81 to the analog input of the switch 63.

The voltage proportional to the temperature of the liquid coolant is supplied from the output of the liquid coolant temperature sensor 54 to the input 48 of the engine operational parameter measuring unit 41, where it is amplified and fed from the output 79 of the amplifier 82 to the analog input of the switch 63.

The pulse signal from the output of the sensor 55 (FIG. 1) is applied to the input 49 of the engine operational parameter measuring unit 41. The code proportional to the fuel consumption is generated in fuel consumption measuring unit 75 and is supplied from the output 76 of the unit 75 to the input of the switch 63.

The voltage $U_6$ (FIG. 4f) proportional to the instantaneous pressure value in the combustion chamber is fed from the output of the gas pressure sensor 56 to the input 50 (FIG. 1) of the engine operational parameter measuring unit 41 where it is amplified and further delivered from the output 74 of the pressure measuring unit 73 to the analog input of the switch 63.

The voltage $U_7$ (FIG. 4g) supplied to the spark plug, or voltages from other points of the electrical equipment of the engine is fed from the output of the gas pressure sensor 57 (FIG. 1) to the input 51 of the engine operational parameter measuring unit 41, where it is amplified and further delivered from the output 72 of the amplifier 71 to the analog input of the switch 63.

All analog signals applied to the input of the switch 63 are converted into the switch 63 into a digital code. Codes are fed from the output 58 of the engine operational parameter measuring unit 41 to the input of the computer 22. Interrogation of parameters is performed by the command delivered from the output 9 of the control unit 10 to the input 45 of the engine operational parameters measuring unit 41.

The voltage proportional to the vibration acceleration is supplied from the engine vibration sensor 1 (FIG. 1) and the transmission vibration sensor 5 via the amplifiers 2 and 6 to the inputs 3 and 7 of the switch 4. The control code is fed to the input 8 of the switch 4 from the output 9 of the control unit 10. In accordance to this code the signal from the outputs of the vibration sensors 1 and 5 passes to the input of the switch 4.

The vibration acceleration signal from the output of the switch 4 is applied to the input 14 of the complex plane analyzer 13. The code of the engine or transmission shaft rotation angle is applied to another input of the complex plane analyzer 13. The complex plane analyzer 13 computes the current value of the amplitude of the vibration vector and its angular position in the coordinates of the unit being monitored. The voltage proportional to the amplitude of the vibration vector is fed from the output 16 of the complex plane analyzer 13 to the input of the second switch 15. The code of the angular position of the vibration vector is fed from the output 17 of the complex plane analyzer 13 to the input of the second switch 15.

The vibration acceleration signal of the vibration sensor 1 or 5 is applied from the output 11 of the switch 4 to the input of the filter 12. The code which determines the amplitude-frequency and phase-frequency characteristics of the filter is supplied to the input 25 of the filter 12. The processed signal is fed from the output 18 of the filter 12 to the input of the second switch 15. The code of the engine or transmission shaft rotation angle is supplied from the output 38 of the synchronization unit 28 to the input 39 of the second switch 15. The control code delivered from the output 9 of the control unit 10 to the input 26 of the second switch 15 determines that either the signals from the complex plane analyzer 13 or the signals from the output of the filter 12 and the synchronization unit 28 are fed to the outputs of the switch 15. The vibration signal is delivered from the output 19 of the second switch 15 to the input of the signal averaging unit 21, whereas the code of the vibration vector or the engine shaft rotation angle code are supplied from the output 20 of the switch 15. The unit 21 averages the vibration amplitudes for each angle. The averaging is controlled by the code supplied from the output 9 of the control unit 10 to the input 27 of the unit 21. The results of averaging are supplied to the input 23 of the computer 22 in accordance with the instruction fed from the output 9 of the control unit 10 to the input 27 of the unit 21. The engine or transmission shaft rotation angle code is supplied to the input 40 of the computer 22 from the output 38 of the unit 28.

The data fed to the computer 22 are accumulated and processed in accordance with a specific programme and the results are produced by a digital printer to characterize the technical condition and operational characteristics of a vehicle.

What is claimed is:

1. An automatic device for diagnostic checkup of vehicles having an engine with at least one engine unit, the device comprising:

at least one vehicle engine vibration sensor, having an output;

at least one vehicle transmission vibration sensor, having an output;

a first switch having a first input electrically connected to said output of said engine vibration sensor, a second input electrically connected to said output of said transmission vibration sensor, a control input and first and second outputs;

a computer;

a control unit having an input whereto a control signal is applied from said computer and an output, the output being connected to said control input of said first switch;

a variable bandwidth filter having an input connected to said first output of said first switch, a control input connected to said output of said control unit, and an output;

a complex plane analyzer of a vibration signal of a vehicle unit being diagnosed, having an input connected to said second output of said first switch, a second input, an amplitude output, and a phase output;

a second switch having a first input and a second input, which are respectively connected to said amplitude output and said phase output of said complex plane analyzer of a vibration signal of the engine unit being diagnosed, a third input whereto said output of said variable bandwidth filter is connected, a control input connected to said output of said control unit, a fifth input, and two outputs;

a signal averaging unit having two inputs connected to said outputs of said second switch, a control input connected to said output of said control unit, and from whose output a signal is applied to an input of said computer;

a synchronization unit having a control input connected to said output of said control unit, an output connected to said second input of said complex plane analyzer of a vibration signal, a group of inputs, and a group of outputs;

a vehicle engine shaft angular position sensor having an output connected to a first input of said group of inputs of said synchronization unit;

a transmission shaft angular position sensor having an output connected to a second input of said group of inputs of said synchronization unit;

at least one ignition sensor having an output connected to a fourth input of said group of inputs of said synchronization unit;

at least one sensor of fuel injection to vehicle engine cylinders, having an output connected to a fourth input of said goup of inputs of said synchronization unit;

a first output of said group of outputs of said synchronization unit being connected to said second input of said complex plane analyzer, to said fifth input of said second switch and wherefrom a signal is also applied to said computer;

an engine operational parameter measuring unit having an output signal applied to said computer, having an input connected to said output of said control unit, a second input, a third input and a fourth input, which are connected respectively to second, third and fourth outputs of said group of outputs of said synchronization unit, and having a group of inputs;

an engine oil temperature sensor having an output connected to a first input of said group of inputs of said engine operational parameter measuring unit;

an engine oil pressure sensor having an output connected to a second input of said group of inputs of said engine operational parameter measuring unit;

an engine liquid coolant temperature sensor having an output connected to a third input of said group of inputs of said engine operational parameter measuring unit;

an engine fuel consumption sensor having an output connected to a fourth input of said group of inputs of said engine operational parameter measuring unit;

at least one engine combustion chamber gas pressure sensor having an output connected to a fifth input of said group of inputs of said engine operational parameter measuring unit;

a spark plug voltage shape sensor having an output connected to a sixth input of said group of inputs of said engine operational parameter measuring unit;

an engine shaft rotational frequency adjustment unit having a control input connected to said output of said control unit, an information input connected to said fourth output of said group of outputs of said synchronization unit, and an output; and an actuator for controlling fuel supply to engine cylinders, having an input connected to said output of said engine shaft rotational frequency adjustment unit.

2. An automatic device as claimed in claim 1, wherein said engine operational parameter measuring unit comprises:

a switch having an output which is said output of said engine operational parameter measuring unit, an input which is a tenth input of said engine operational parameter measuring unit, said tenth input being said input of said engine operational parameter measuring unit connected to said output of said control unit, and a group of inputs;

an angular measurement unit having two inputs which are said second and said third inputs of said engine operational parameter measuring unit connected to said second and third outputs of said synchronization unit, and an output connected to a first input of said group of inputs of said switch;

a unit for measuring the angular speed and rotary acceleration of the engine shaft having an input which is a ninth input of said engine operational parameter measuring unit, said ninth input being one of said inputs of said engine operational parameter measuring unit, connected to said synchronization unit, and said measuring unit having two outputs connected to a second input and a third input from said group of inputs of said switch;

a spark failure percentage calculating unit having two inputs connected to respective said inputs of said angular measurement unit and an output connected to a fourth input from said group of inputs of said switch;

an engine electrical parameter measuring unit having an input which is said sixth input of said group of inputs of said engine operational parameter measuring unit connected to said voltage shape sensor, and an output connected to a fifth input of said group of inputs of said switch;

a combustion chamber gas pressure measuring unit having an input which is said fifth input of said group of inputs of said engine operational parameter measuring unit connected to said combustion chamber gas pressure sensor, and an output connected to a sixth input of said group of inputs of said switch;

a fuel consumption measuring unit having an input which is said fourth input of said group of inputs of said operational parameter measuring unit connected to said fuel consumption sensor, and an output connected to a seventh input of said group of inputs of said switch;

an eighth input of said group of inputs of said switch, which is said first input of said group of inputs of said operational parameter measuring unit, whereto said oil temperature sensor is connected;

a ninth input of said group of inputs of said switch, which is a seventh input of said operational parameter measuring unit, said seventh input being said second input of said group of inputs of said operational parameter measuring unit, whereto said oil pressure sensor is connected; and a tenth input of said group of inputs of said switch, which is an eighth input of said operational parameter measuring unit, said eighth input being said third input of said group of inputs of said operational parameter measuring unit, whereto said liquid coolant temperature sensor is connected.

3. An automatic device as claimed in claim 2, wherein said engine shaft rotational frequency adjustment unit comprises:

a pulse length generator having an input which is said information input of said engine shaft rotational frequency adjustment unit, and an output;

a reference frequency generator having an input which is said control input of said engine shaft rotational frequency adjustment unit, and an output;

an AND gate having a first input whereto said output of said pulse length generator is connected, a second input connected to said output of said reference frequency generator, and an output;

a binary counter having a counting input connected to said output of said AND gate, and two outputs;

a circuit for determination of the magnitude of deviation of the parameter being adjusted, having an input connected to said output of said binary counter, and an output;

a regulating signal generator having an input connected to said output of said circuit for determination of the magnitude of deviation of the parameter being adjusted, and an output;

a circuit for determination of the sign of deviation of the parameter being adjusted, having an input connected to said output of said binary counter, and first and second outputs;

a first gate having a first input connected to said first output of said circuit for determination of the sign of deviation of the parameter being adjusted, a second input connected to said output of said regulating signal generator, and an output which is said output of said engine shaft rotational frequency adjustment unit; and a second gate having a first input connected to said second output of said circuit for determination of the sign of deviation of the parameter being adjusted, a second input connected to said output of said regulating signal generator, and an output which is said output of said engine shaft rotational frequency adjustment unit.

* * * * *